May 16, 1961 P. M. HIGGS ET AL 2,984,719
SHOCK AND PRESSURE SENSITIVE SWITCH
Filed Aug. 20, 1953 3 Sheets-Sheet 3

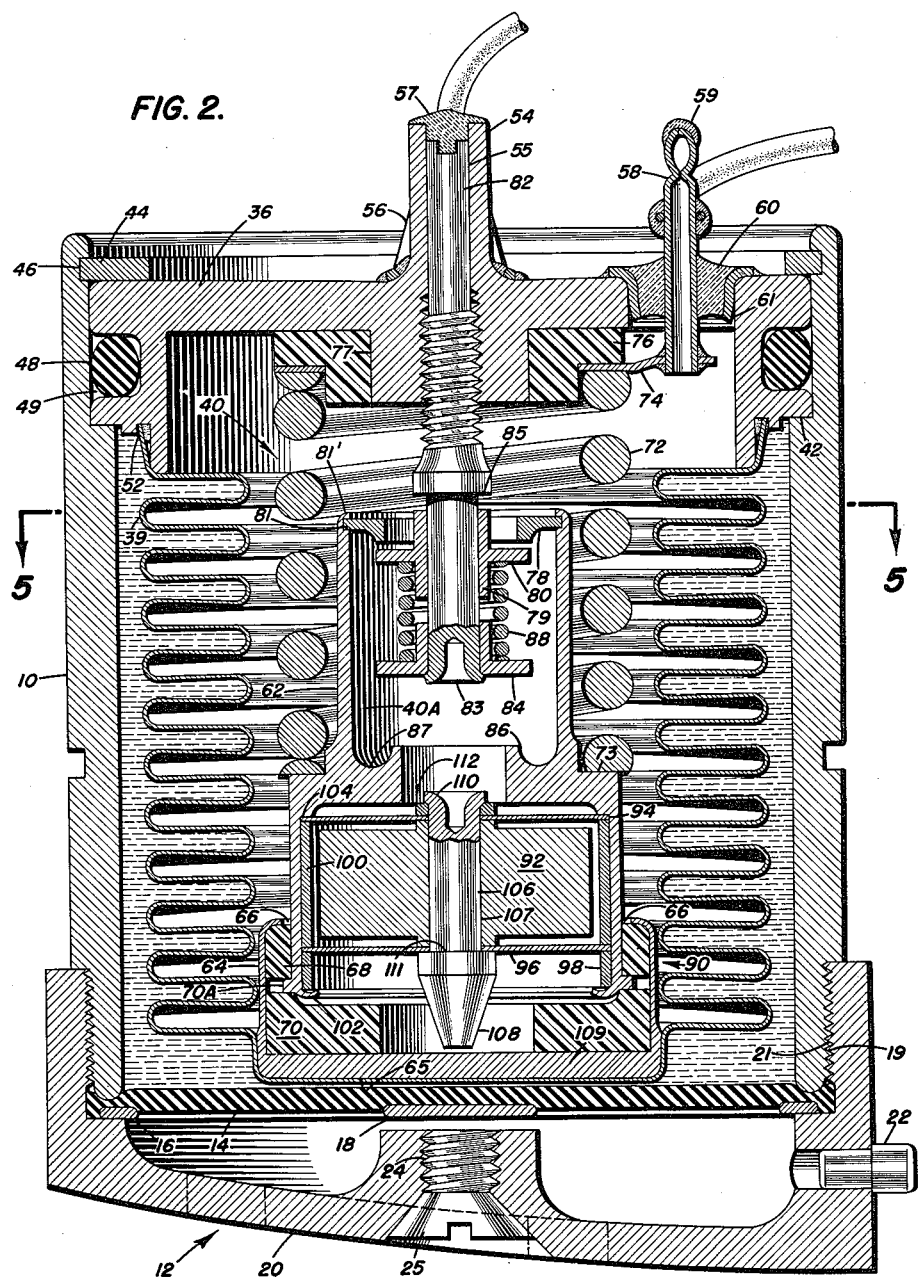

INVENTORS
PAUL M. HIGGS
ROY H. MALM
JACK B. ROBERTSON
BY
*G. D. O'Brien*
*Q. Baxter Warren*
ATTORNEYS 2,984,719
Patented May 16, 1961

2,984,719
SHOCK AND PRESSURE SENSITIVE SWITCH

Paul M. Higgs, Roy H. Malm, and Jack B. Robertson, Seattle, Wash., assignors to the United States of America as represented by the Secretary of the Navy Filed Aug. 20, 1953, Ser. No. 375,583

8 Claims. (Cl. 200—83)

This invention relates to switches. In more detail, it relates to an improved switch particularly adapted for use as an anti-countermining and depth sensing device for a torpedo.

It is desirable to deactivate the influence exploder mechanism carried in a torpedo when the latter is running too shallow, or too deep to be effective in destroying or crippling a target vessel. In addition, to prevent premature detonation of the torpedo's explosive charge, it is desirable to provide an anti-countermining feature to cooperate with the exploder mechanism in such a manner as to deactivate the latter in the event of broaching by the torpedo, or other shocks. These functions are usually performed by shock and depth sensing units which are combined with torpedo exploder circuits of the influence type so as to prevent any output from the exploder except under desired conditions.

It is a primary object of the present invention to provide improved means for deactivating a torpedo exploder mechanism upon the torpedo's running too shallow or too deep, upon its broaching, or being subjected to other shocks including countermining shocks.

It is a further object of this invention to provide an anti-countermining and depth sensing switch that is mechanically sound and able to withstand the severe mechanical shocks to which it is subjected at torpedo launching.

It is an additional object to provide a depth sensing mechanism that is extremely sensitive to changes in depth but is insensitive to temperature changes within the ranges in which it is expected to operate.

A still further object of the invention is to provide a switch having an anti-countermining mechanism of great sensitivity.

Other objects and many of the attendant advantages of this invention will be readily appreciated as the same becomes better understood by reference to the following detailed description when considered in connection with the accompanying drawings wherein:

Fig. 4 is a bottom view of the switch;

Fig. 5 is a sectional view on line 5—5 of Fig. 2; and

Fig. 6 is a sectional view on line 6—6 of Fig. 4.

Figure 1:
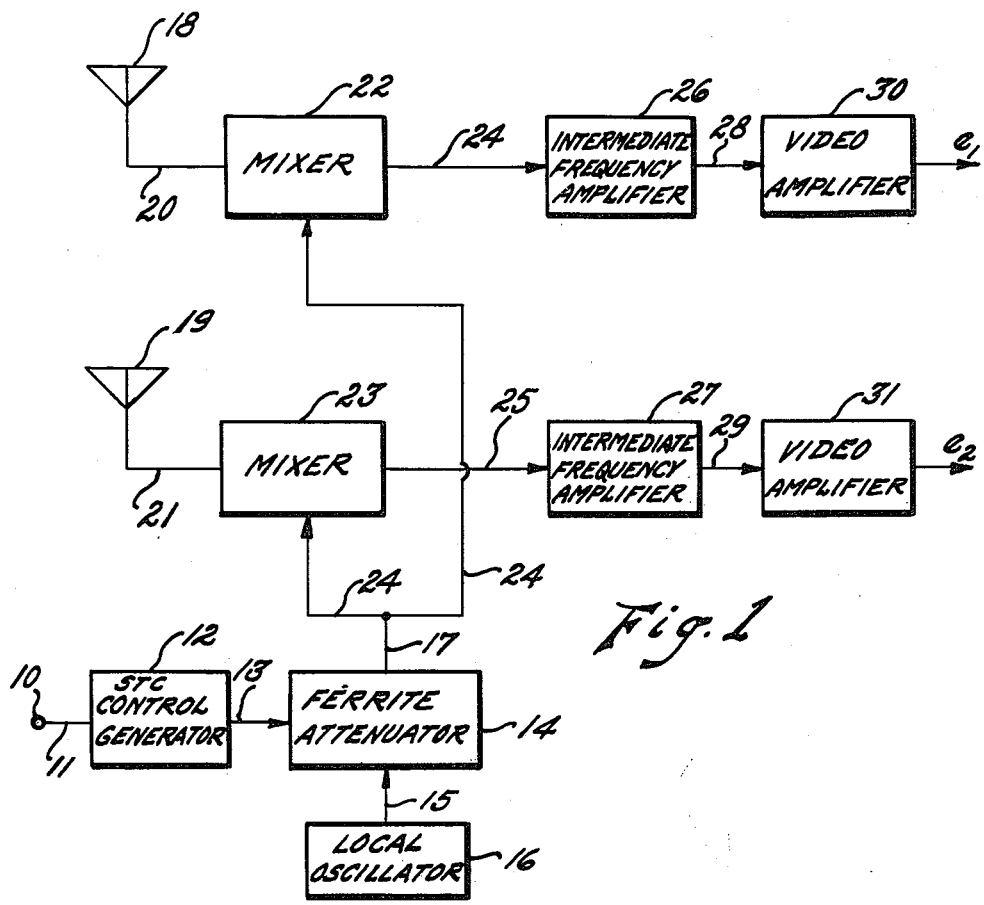
Fig. 1 is a perspective view, partly in section, of the switch, showing the shallow limit contacts in the closed circuit position.
Figure 2:
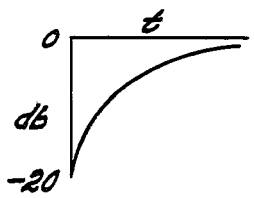
Fig. 2 is an enlarged sectional view on line 2—2 of Fig. 3, showing the switch in open circuit condition.
Figure 3:
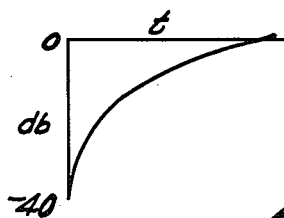
Fig. 3 is a plan view of the switch.

Briefly, the switch of the present invention includes a plurality of contacts arranged inside a sealed waterproof housing which is adapted to be carried in a torpedo. Separate pairs of contacts are provided as follows: a first pair to be actuated by inertia in the event of countermining shocks or broaching of the torpedo, a second pair actuable by the torpedo's running too shallow, and a third pair to be actuated by its running too deep. The housing is closed at one end by a pressure responsive element that is exposed to the hydrostatic pressure present at the depth of the water in which the torpedo is traveling. The pressure acting on the element is transmitted to an evacuated bellows type inner housing that carries a body having one contact of each of the pairs of contacts mentioned above mounted thereon. The other contacts of the pairs that are actuable by the depth of water are adjustably mounted on the switch housing. The remaining contact of the pair that is operable by inertia due to shock is carried by a mass which is flexibly mounted on the body, insulated from and in spaced relationship to the first mentioned contact of this pair. The depth actuated pairs of contacts are maintained in spaced relationship corresponding to the open circuit condition when the torpedo is running normally at a depth within pre-set limits. In the event of broaching, shock, shallow running, or deep running, the switch is closed to short circuit the output circuit of the influence exploder. Other features of the switch include adjustable means for varying the limit settings and means for making the switch inoperable.

The invention is shown in the drawings in detail as comprising a generally cylindrical housing 10 which is sealed at both ends so as to be water tight. It will be understood that this housing is designed to be fitted in a hole provided in the skin of a torpedo so that the lower end of the housing cooperates with the skin to present an unbroken surface. The lower end of the housing 10 is sealed by an assembly generally indicated at 12 which includes a flexible waterproof diaphragm 14 having an outer metal ring 16 and a central metal shield 18 molded therein. The diaphragm 14 is held in place so as to seal the lower end of the cylindrical housing 10 by a bottom cap 20 provided with threads 19 which cooperate with threads 21 on the housing. A locating pin 22 is provided at the periphery of the cap 20, for properly orienting the switch in the torpedo. A screw hole 24 is provided centrally of the cap 20 into which a short screw 25 is threaded. The short screw 25 may be replaced by a longer screw, not shown, for a purpose that will be explained hereinafter in connection with the explanation of the operation of the switch.

As is shown in Fig. 4, a number of orifices 26 are provided in the bottom cap 20 so that water, under the pressure corresponding to the depth at which the torpedo is traveling, will act on the diaphragm 14. Each of the orifices 26 is provided with an inclined forwardly directed inlet trough which, when the cap 20 is in place, will extend toward the nose of the torpedo. These troughs, indicated at 28, 30, 32 and 34, serve to furnish positive dynamic pressure at the orifices 26 to counteract the negative dynamic pressure existing on the surface of the running torpedo at the place where the switch is located. The troughs are of different shapes merely to simplify the operation of machining the bottom cap 20.

The upper end of the cylindrical housing 10 is closed by a top cap 36 which carries an inner housing constituted by an evacuated bellows 39 to house the switch body and contact assembly indicated generally by the reference numeral 40. The top cap is held in place against a shoulder 42 formed on the inside surface of the housing 10 by a retaining ring 44 engaging a groove 46 in the housing. The top cap 36 carries a rubber O-ring 48 in an annular recess 49 to seal the inside of the housing 10. The bellows 39 is sealed to the top cap 36 by a solder joint shown at 52. The space between the housing 10 and the bellows 39 is filled with a damping fluid free of bubbles. A commercially available silicone damping fluid is suitable for this purpose.

One of the terminals by which the switch can be connected into an influence exploder circuit is indicated at 54 in the form of a center post on the top cap 36 to which a soldering lug 56 is attached. The aperture 55 contact to its original position, said movable contact being movable in the direction of engagement with its corresponding fixed contact, a switch body commonly mounting each of the movable contacts and secured in said inner housing and movable therewith, and a mass movably mounted in said switch body, said mass being coupled to one of said relatively fixed contacts and remaining inert upon the sudden movement of said inner housing and said switch body to cause a change of relative position between said fixed contact coupled to said mass and one of said movable contacts on said switch housing, closure of the two last-mentioned contacts being effected when said change of relative position reaches a predetermined value, another of said pairs having its movable contact depending from said switch body and being movable into engagement with its corresponding fixed contact upon the application of pressure to said inner housing to compress said inner housing, a third pair of said pairs of contacts having its movable contact depending from said switch body and being movable into engagement with its corresponding fixed contact upon the relief of pressure from said housing to expand said housing.

2. A switch as claimed in claim 1, with additionally a pressure responsive element on said outer housing for transmitting pressure to the inside of said outer housing.

3. A switch as claimed in claim 2, with additionally manual means for applying pressure to said pressure responsive element, said manual means including a member threadably attached to said outer housing and engageable with said pressure responsive element.

4. An electric switch comprising a sealed housing, a pressure sensitive diaphragm closing one end of said housing, a cap closing the other end of said housing, a first set of contacts mounted on said cap, an expansible evacuated housing carried on said cap and extending into said sealed housing, said expansible housing inclosing said first set of contacts and having a base at the end extending into said sealed housing, a switch body positioned inside said expansible housing and mounted on said base and constrained to move with said base in relation to said cap, said switch body including a second set of contacts, means interposed between said sealed housing and said switch body for yieldingly maintaining said first set of contacts on said cap and said second set of contacts on said body in spaced relationship, means for transmitting pressure from said pressure sensitive diaphragm to said expansible housing to move a contact of said second set with respect to a contact of said first set to close said switch upon appropriate response of said diaphragm to pressure variations.

5. An electric switch comprising a sealed housing, a pressure sensitive diaphragm closing one end of said housing adapted to be exposed to hydrostatic pressures, a cap closing the other end of said housing, a first set of resiliently spaced contacts slidably mounted on said cap, means for limiting the sliding movement of said spaced contacts, means for making electrical connection to said spaced contacts, an evacuated expansible housing carried on said cap and extending into said sealed housing, said expansible housing inclosing said first set of contacts and having a base formed at the end extending into said sealed housing, a switch body positioned inside said expansible housing and attached to said base for movement in relation to said cap, said switch body carrying a second set of contacts, means interposed between said cap and said switch body for yieldingly maintaining said first set of contacts on said cap and said second set of contacts of said switch body in spaced relationship, said first set of contacts being slidable in the direction of engagement with said second set of contacts, and means for transmitting pressure from said pressure sensitive diaphragm to said expansible housing to move a contact of said second set with respect to a contact of said first set to close the circuit of said switch upon appropriate response of said diaphragm to variations in hydrostatic pressure.

6. In an electric switch for a torpedo, a housing, a pressure sensitive diaphragm closing the housing at one end thereof, a bottom cap securing the diaphragm to the housing, a top cap closing the housing at its opposite end, said caps and diaphragm hermetically sealing the housing, a bellows secured to the top cap within the housing, a switch body within the bellows and carried thereby, said body having spaced contacts, a stem on the top cap and having contacts thereon normally selectively engageable with the first-mentioned contacts, and resilient means normally urging the bellows and switch body downwardly within the housing for open-circuiting the contacts, pressure gradients exerted on the diaphragm shifting the bellows for moving certain of the contacts into circuit closing position.

7. A switch as claimed in claim 6, wherein said last-mentioned contacts are slidably mounted on said stem for movement in the direction of engagement with said first-mentioned contacts, said stem having shoulders thereon to limit said sliding movement, and resilient means disposed between said last-mentioned contacts to maintain the latter yieldingly in spaced relationship.

8. A switch as claimed in claim 7 with additionally a short circuiting means including a screw threadably engaged with said housing and positioned such that the screw may be turned to urge said switch body in a direction so as to effect engagement between one of each of said first and last-mentioned contacts.

References Cited in the file of this patent

UNITED STATES PATENTS

| | | |
|---|---|---|
| 1,354,069 | Terhaar | Sept. 28, 1920 |
| 1,845,848 | Richards | Feb. 16, 1932 |
| 2,200,599 | Gaynor | May 14, 1940 |
| 2,283,180 | Buchanan | May 19, 1942 |
| 2,426,034 | Leonard | Aug. 19, 1947 |
| 2,450,961 | Heymann et al. | Oct. 12, 1948 |
| 2,468,768 | Malick | May 3, 1949 |
| 2,537,354 | Korte et al. | Jan. 9, 1951 |
| 2,549,863 | Thornton | Apr. 24, 1951 |
| 2,671,833 | Dunmeyer | Mar. 9, 1954 |

May 16, 1961 J. BRONSTEIN ET AL 2,984,741
SENSITIVITY TIME CONTROL SYSTEM
Filed Aug. 8, 1960 2 Sheets—Sheet 1

INVENTORS
JACOB BRONSTEIN
AND SHELDON Z. RAMBO
BY
ATTORNEYS